United States Patent [19]

Inoue et al.

[11] Patent Number: 4,618,761
[45] Date of Patent: Oct. 21, 1986

[54] ELECTRODE CUTTING APPARATUS FOR WIRE CUT ELECTRIC DISCHARGE MACHINE

[75] Inventors: Kiyoshi Inoue, Tokyo; Tatsue Toyoshima, Kawasakishi, both of Japan

[73] Assignee: Inoue-Japax Research Incorporation, Yokohamashi, Japan

[21] Appl. No.: 532,177

[22] Filed: Sep. 14, 1983

[51] Int. Cl.⁴ .............................................. B23P 1/08
[52] U.S. Cl. ................................ 219/517; 219/69 W; 219/69 E; 83/926 B; 83/171
[58] Field of Search ............... 219/69 W, 69 M, 69 R, 219/68; 83/926 B, 907, 917, 171, 16; 225/93.5

[56] References Cited

U.S. PATENT DOCUMENTS

| | | | |
|---|---|---|---|
| 432,630 | 7/1890 | Lemp | 219/50 X |
| 2,358,772 | 9/1944 | Brow et al. | 83/16 |
| 2,606,266 | 8/1952 | Duch et al. | 219/68 |
| 3,822,374 | 7/1974 | Ullmann et al. | 219/69 W |
| 3,912,899 | 10/1975 | Lehmann et al. | 219/69 W |
| 4,242,559 | 12/1980 | Roemer et al. | 219/69 W |
| 4,277,996 | 7/1981 | Spengler | 83/171 |
| 4,367,392 | 1/1983 | Girardin | 219/69 W |
| 4,379,959 | 4/1983 | Inoue | 219/69 W |

FOREIGN PATENT DOCUMENTS

| | | | |
|---|---|---|---|
| 0148783 | 12/1978 | Japan | 83/16 |
| 56-157926 | 6/1981 | Japan . | |

Primary Examiner—M. H. Paschall
Attorney, Agent, or Firm—Roberts, Spiecens & Cohen

[57] ABSTRACT

A wire electrode cutting apparatus for use in a wire-cut electric discharge machine mounted between a supply section for the wire electrode and a pulling section therefor, and comprising a device for applying a constant tensile force to the wire electrode and for sensing that the constant tensile force has been applied thereto, and a power supply for applying an electric current to the wire electrode to heat the same when a predetermined tensile force has been applied thereto.

10 Claims, 9 Drawing Figures

ELECTRODE CUTTING APPARATUS FOR WIRE CUT ELECTRIC DISCHARGE MACHINE

TECHNICAL FIELD

This invention relates to a wire-electrode cutting apparatus and, more particularly, to a wire-electrode cutting apparatus adapted to cut a wire-cutting electrode to be used for a wire-cut electric discharge machine.

BACKGROUND ART

Recently, in order to improve the performance and precision of wire cut spark erosion equipment, the wire-electrode to be used for wire-cut spark erosion has a high-tensile strength, e.g. a brass (Copper-Zinc alloy). Therefore, when one tries to cut the wire in a conventional manner by strongly pulling the wire-electrode by gripping it by hand or grasping it with the hand with a portion thereof wound around a finger, a large force is required to cut the wire and there is also the danger of cutting the hand and finger of the operation.

As a consequence, it can be considered to use pliers, cutting nippers, cutting pliers, or other kinds of metal scissors to cut the wire electrode. However, cutting by means of such tools causes various types of burrs, bending portions, damaged portion, etc. at the cutting edge portions by the wire-electrode. In many cases, the diameter of the tool's cutting surface is substantially the same as that of the wire-electrode used, or the cutting surface is pressed flat with a large maximum diameter. Thus, there is the problem in the subsequent wire-cut spark erosion that it is difficult to smoothyl perform the installing work of the wire-electrode by passing it through a pair of upper and lower wire-electrode guides, working fluid injecting nozzles, work starting holes of the workpiece, or the like.

Because of such reasons, upon the cutting of a wire-electrode, the cutting portion is pulled and stretched so as to be thin by applying a tensile force to the wire electrode to cut the wire while causing work hardening, thereby obtaining a cutting portion which has a better linearity but no burr. However, for a wire-electrode with a high tensile strength that has been frequently used in recent years as described above, even if it is cut by means of a mechanical stretching-cutting apparatus, the electrode wire will have been cut before it is sufficiently pulled and stretched since the elongation percentage is low, although the tnesile strength is high, thus the cutting edge portion does hot become straight. In addition, the electrode wire is cut so that the cross section of the cutting portion is about the same shape before cutting, and any burrs and the like are frequently formed on the cutting surface. Hence, it is difficult to pass the wire-electrode through the guides and nozzles of the working machine, the inserting hole of the workpiece or the like.

Therefore, there has been proposed to heat the wire electrode before applying the tensile force to the wire electrode in its axial direction, thereby melt-cutting or cutting while pulling and stretching the wire; this technique is disclosed in a U.S. Pat. No. 4,379,959 of 1981. However, in this well-known technique, since the control of the temperature and tensile force when cutting the wire electrode is insufficient, the shape of the cutting edge is unstable and there are such problems that the heating apparatus is large and the work is not rapidly done.

DISCLOSURE OF THE INVENTION

The present invention was made to eliminate such conventional drawbacks. It is an object of the invention to provide a novel wire cutting apparatus in which a simple heating apparatus can be used and the wire electrode can be almost instantaneously cut at a desired location, and in which the wire electrode can be cut so that the end portion is straight and elongated and in a better state such that no burr exists at the cutting surface.

The gist of the present invention is that the wire electrode cutting apparatus is constituted in such a manner that the cutting is done while pulling and stretching and locally heating the wire electrode at a constant temperature in the state that a constant tensile force is applied to the cutting portion of the wire electrode, thereby obtaining the elongated cutting edge without any burrs.

BEST MODE FOR CARRYING OUT THE INVENTION

Figure 1:
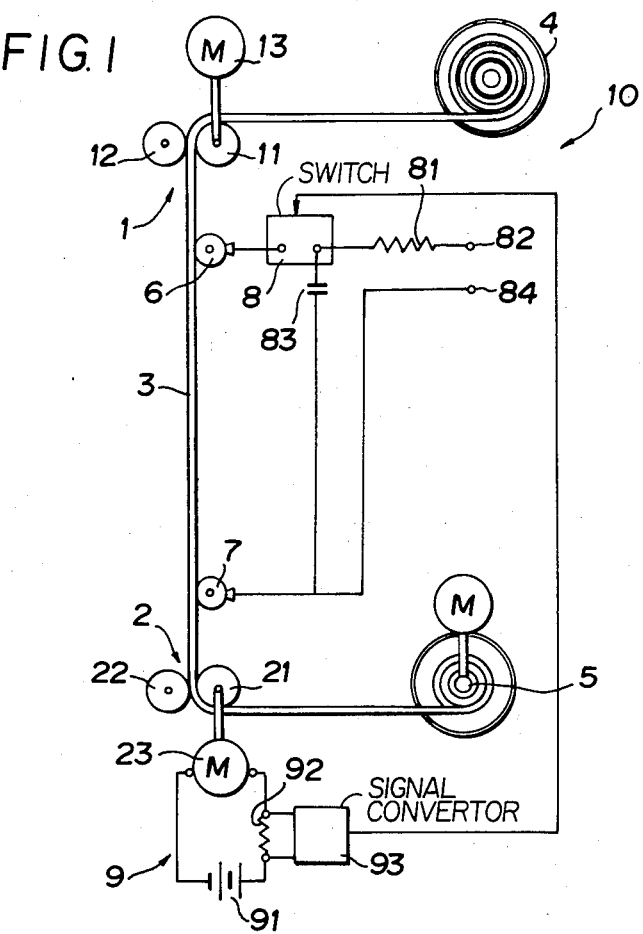
FIG. 1 is an explanatory diagram showing an embodiment of a wire electrode cutting apparatus according to the present invention.

In FIG. 1, a wire electrode cutting apparatus 10 comprises a wire electrode supply section 1 and a wire electrode pulling section 2 which are mounted on bases or the like (not shown) attached respectively to a pair of upper and lower arms (not shown) that are fixedly or elevationally supported on a column of a wire-cut electric discharge machine.

In the embodiment shown in FIG. 1, the supply section 1 and the pulling section 2 are similarly constituted; namely, they comprise capstans 11 and 21, pinch rollers 12 and 22 adapted to press a wire electrode 3 against the capstans 11 and 21, and motors 13 and 23 for driving the capstans 11 and 21.

A reel 4 supplies the wire electrode 3, while a reel 5 collects the electrode. The wire electrode 3 is pulled out from the supplying reel 4 and gets through the pass between the capstan 11 and the pinch roller 12, Then, it passes between the capstan 21 and the pinch roller 22 at the wire electrode pulling section 2 and is wound around collecting reel 5. The wire electrode 3 may be cut so as to be of proper length and scrap may be thrown into a vessel and the like as short pieces.

Although not shown, the pinch rollers 12 and 22 are constituted in such a manner that they sufficiently and strongly press the wire electrode 3 against the capstans 11 and 21 by well-known means such as a spring or the like, and these pinch rollers are rotatably supported while being applied with the frictional forces by the capstans 11 and 21.

On the other hand, although the motor 13 is not necessarily an essential component for the spark erosion, it is needed for automatic wire-threading after cutting the wire electrode.

The capstan 21 is coupled to the motor 23 and is constituted so as to rotate in the direction so that the wire electrode 3 moves from the supply portion 1 to the pulling section 2 and so as not to move the wire electrode 3 if the motor 23 is inoperative during the spark erosion.

Although the motores 13 and 23 synchronously rotate during the electric discharge work, the peripheral speed of the capstan 21 on the pulling side is larger than that of the capstan 11 on the supply slide because the diameter of the capstan 11 is slightly smaller than that of the capstan 12; thus, a predetermined tensile force is applied to the wire electrode, 3.

However, during the spark erosion, the motor 13 to drive the capstan 11 may be used as a braking generator, and the capstan 11 may be also used not as a capstan but as a braking roller or a loading roller.

A capacitor 83 is charged to a predetermined voltage through a resistor 81 by a DC power supply (not shown) connected to terminals 82 and 84. Power feeding pulleys 6 and 7 are arranged with a predetermined spacing between the supply section 1 and the pulling section 2. These power feeding pulleys 6 and 7 are adapted to detachably abut against the wire electrode 3 and are connected through a switch 8 with the capacitor 83. These pulleys come into contact with the wire electrode 3 which is stretched between the supply section 1 and the pulling section 2 if necessary when the wire electrode is cut. When the switch 8 is turned on, the charge accumulated in the capacitor 83 flows from the power feeding pulley 6 through the wire electrode 3 between the pulleys 6 and 7 to the pulley 7, thereby heating the wire electrode 3.

Although not shown, well-known wire electrode positioning guides of the die type or boat form having a V groove or the like are respectively provided between the supply section 1 and the power feeding pulley 6 and between the pulling section 2 and the power feeding pulley 7. The region between the above-mentioned pair of positioning guides is a workpiece working section.

On the other hand, a tension detecting mechanism 9 for detecting tensile force applied to the wire electrode 3 is attached to the motor 23.

The tension detecting mechanism 9 comprises a power supply 91 for supplying a driving power to the motor 23, a resistor 92 interposed between the motor 23 and the power supply 91 for sensing the power supplied, and a signal converter 93. Input terminals of the signal converter 93 are conncected across the resistor 92 and its output terminal is connected to the switch 8 to send a switching control signal.

While performing the spark erosion, the capstans 11 and 21 of the supply section 1 and pulling section 2 are rotated at the same speed or with a slight difference in speed, and the wire electrode 3 which has been wound around the supply reel 4 is sent out from the sending section 1 to the pulling section 2. Upon completion of the work, and when the wire electrode 3 is cut, the power feeding pulleys 6 and 7 are first moved to come into contact with the wire electrode 3, then the rotation of the motor 13 of the supply section 1 is stopped and only the motor 23 of the pulling section 2 is rotated.

In this state, the wire electrode 3 is fixed on the side of supply section 1 or forcibly pulled causing the motor 13 to reversely rotate, so that the tensile force to be applied to the wire electrode 3 rapidly increases.

As the tensile force applied to the wire electrode 3 increases, the load of the motor 23 to rotate the capstan 21 also increases, so that the current to drive the motor 23 increases and a potential difference between both terminals across the resistor 92 increases.

When this electric potential difference reaches a constant fixed value, a control signal is transmitted from the signal converter 93 to the switching control unit of the switch 8 to close the switch 8, thereby closing the electric dishcarging circuit consisting of the switch 8, power feeding pulley 6, wire electrode 3, and power feeding pulley 7. This, the charges that have been preliminarily accumulated in the capacitor 83 flow through the wire electrode 3 to heat and soften the electrode. Consequently, the wire electrode 3 is elongated and becomes thin, and finally, it is cut at the intermediate portion between the power feeding pulleys 6 and 7.

Figure 2:
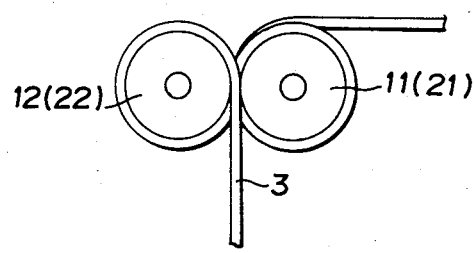
FIG. 2 is a partially enlarged explanatory diagram thereof.

In this embodiment, although the wire electrode 3 is constituted in such a manner that it is sandwiched by the capstan 11 and pinch roller 12 and by the capstan 21 and pinch roller 22, this may be constituted in such a manner as shown in FIG. 2 that the wire electrode 3 is wrapped around the capstan 11 and pinch roller 12 and then around the capstan 21 and pinch roller 22 (this wrapping order may be reversed; namely, the wire electrode 3 may be wrapped around the pinch roller 12 and capstan 11 and then around the pinch roller 22 and capstan 21) in order to prevent the wire electrode 3 from slipping.

Next, the present invention will be described in detail with reference to FIGS. 3 to 7.

Figure 3:
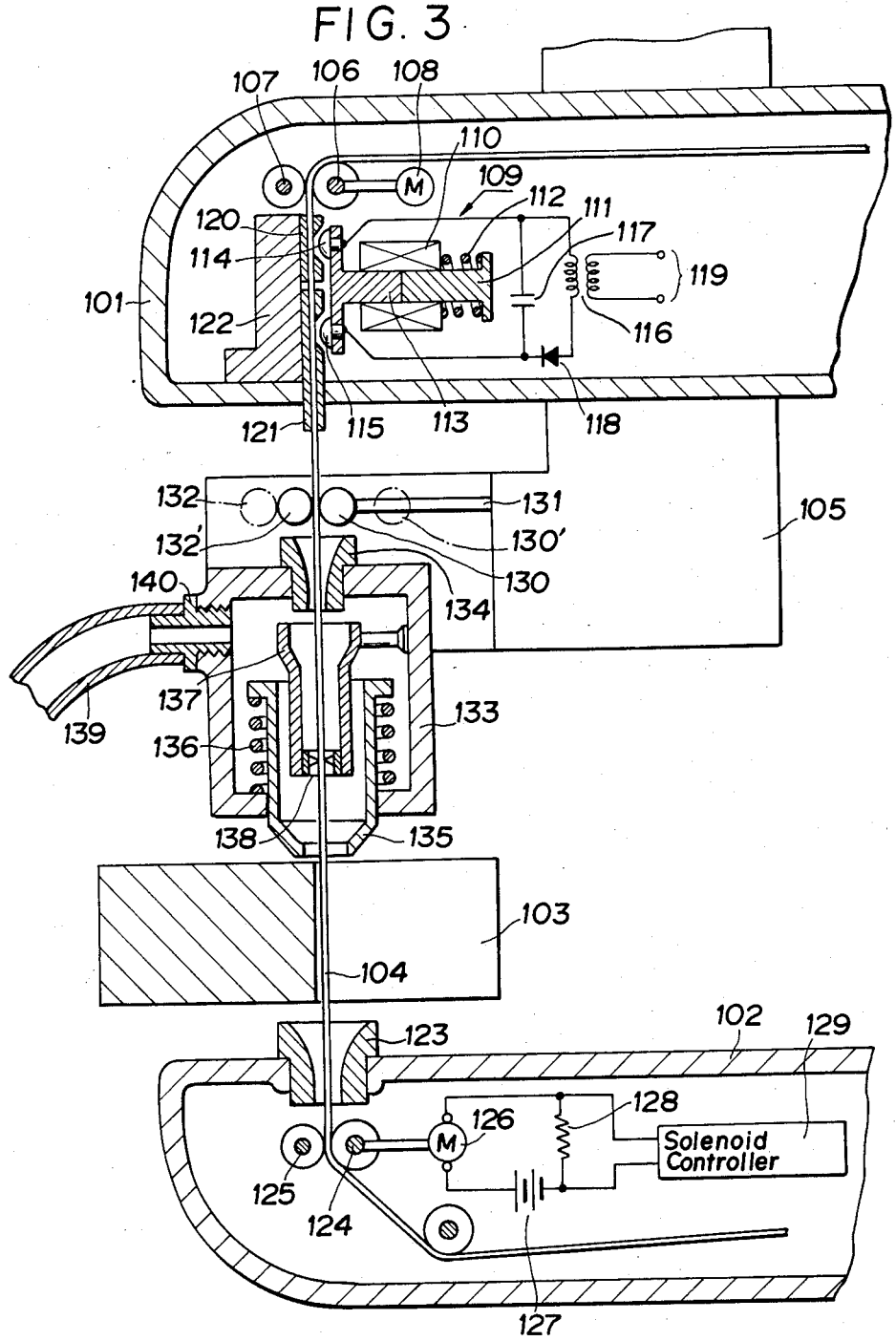
FIG. 3 is a cross sectional view showing an embodiment of the wire electrode cutting apparatus installed in a wire-cut electric discharge machine.
Figure 4:
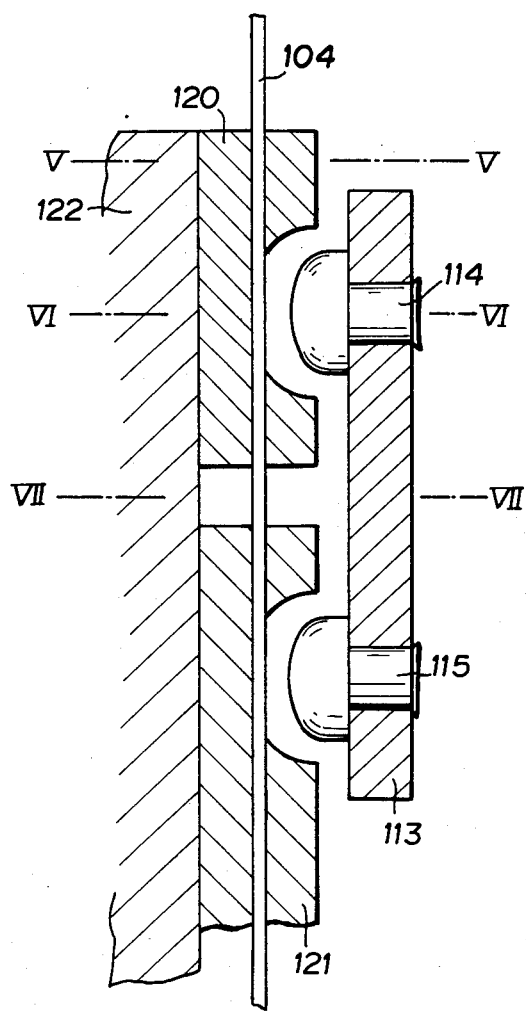
FIG. 4 is a cross sectional enlarged view of the wire electrode cutting section of the apparatus shown in FIG. 3.
Figure 5:
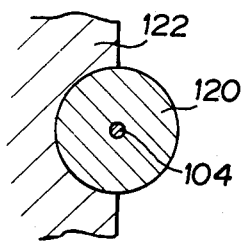
FIG. 5 to 7 are cross sectional views taken along lines V—V, VI—VI and VII—VII in FIG. 4, respectively.
Figure 6:
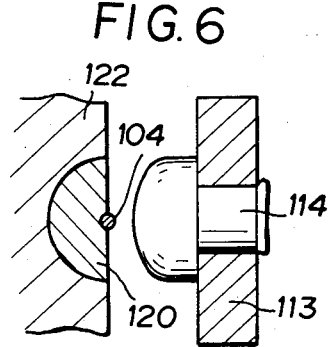
Figure 7:
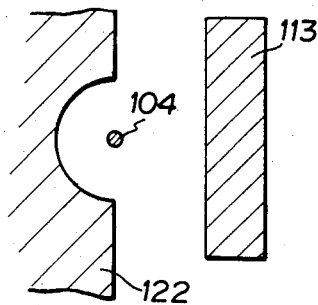

Referring to FIG. 3, there is illustrated a wire electrode cutting apparatus with a construction similar to the above-mentioned embodiment installed in the electric discharge machine.

In FIG. 3, reference numerals 101 and 102 indicate upper and lower arms which are fixed or elevationally supported on a column of the electric discharge machine (not shown); 103 is a workpiece which is supported by a well-known supporting apparatus (not shown) and is fed for working; 104 a wire electrode; 105 a work head elevationally supported on the arm 101; 106 a capstan for advancing the wire electrode; 107 a pinch roller for advancing the wire electrode; 108 a braking motor for driving the capstan 106; 109 denotes a solenoid consisting of a coil 110, and iron core 111, a spring 112, a contact holder 113, and contacts 114 and 115; 116 a power transformer; 117 a capacitor; 118 a diode; 119 power terminals; 120 and 121 are cooling tubes; 122 a cooling tube holder; 123 an electrode guide; 124 a capstan for pulling the wire electrode; 125 a pinch roller for pulling the wire electrode; 126 a motor to drive the capstan 124; 127 a DC power supply to drive the motor 126; 128 a resistor interposed to detect armature current of the motor 126; 129 a circuit for controlling the solenoid 109 (i.e. a solenoid controller); 130 a power supplying shoe for spark erosion; 131 an energizing shoe holder which is movably supported by the work head 105; 132 a pressure contact member which is detachably supported through the wire electrode 104 to the power supplying shoe by the work head 105; 133 a nozzle casing fixed to the work head 105; 134 a guide for the electrode; 135 a working fluid nozzle; 136 a spring; 137 a guide holder for supporting a die-type electrode guide 138; 139 a hose for introducing the working fluid from a working fluid supplying apparatus (not shown); and 140 a nozzle for fixing the hose.

Referring again to FIG. 3, there is shown the state in which the spark erosion has been finished. Although the work feeding of the workpiece 103, supply of the working fluid from the hose 139 and supply of working pulses from the power supplying shoe 130 are all stopped, the feeding of the wire electrode by the capstans 124 and 106 is still continued, The coil 110 of the solenoid 109 is not energized, so that the contacts 114 and 115 are spaced from the wire electrode 104.

To cut the wire electrode 104 in this state, the power supplying show 130 and its holder 131 are first moved rewardly to the location indicated by the chain lines and a driving current of the braking motor 108 is reduced at a proper rate while rotating the motor 126, thereby reducing the speed of the motor 108.

In this case, the load of the motor 126 gradually increases and the tensile force applied to the wire electrode 104 increases, and the driving current of the motor 126 also increases.

By preliminarily adjusting the relation between this tensile force and the motor driving current, when the driving current reaches a constant valve, it is possible to know that the tensile force has reached a desired value.

When the driving current of the motor 126 reaches the constant value, the solenoid controller 129 energizes the coil 110 of the solenoid 109 to move the iron core 111 to the left in FIG. 3 causing the contracts 114 and 115 to come into contact with the wire electrode 104 through the contact holder 113, whereby applying rapid braking to the braking motor 108 to stop it.

At this time, the charges in the capacitor 117 are discharged through the wire electrode 104 between the contacts 114 and 115 and the wire electrode 104 is heated. However, the wire electrode 104 in the corresponding portion passes through the inside of the cold reserving tubes 120 and 121, and since the heat of that portion inside thereof is absorbed by the cooling tubes 120 and 121, and increase in temperature is suppressed. Thus, only the portion located at the gap between both cooling tubes assures a high temperature, resulting in a reduction of the tensile strength and an increase in elongation, so that the wire electrode 104 is cut at this portion. The details of the cooling tubes 120 and 121 are illustrated in FIGS. 4 to 7.

By performing the cutting operation in such a manner as described above without stopping the motor 126, the wire electrode can be smoothly cut without being affected due to a pulse current, shock, or the like of the motor 126.

After completion of the cutting, the wire electrode 104 thus cut is wound by the capstan 124 and then the workpiece 103 whose work has been finished is replaced by a new one.

At this time, the capstans 106 and 124 are again rotated and the free edge portion of the wire electrode 104 remaining in the gap between the cooling tubes 120 and 121 passes through the inside of the cooling tubes 121 and drops. Thereafter, it sequentially passes through the electrode guide 134 and die-type electrode guide 138, and if necessary, it passes through a small hole formed at the work starting point in the workpiece 103, then passes through the electrode guide 123 and enters the lower arm 102. The wire electrode 104 then enters the space between the capstan 124 and the pinch roller 125 and is caught. Thereafter, it is introduced to a collecting assparaus (not shown) by a well-known pulling apparatus (not shown).

A wire electrode cutting apparatus shown in FIGS. 8 and 9 will be described hereinbelow.

This embodiment is separately provided from the electrode feeding mechanism for spark erosion such as the above-mentioned capstan 106 or the like.

Figure 8:
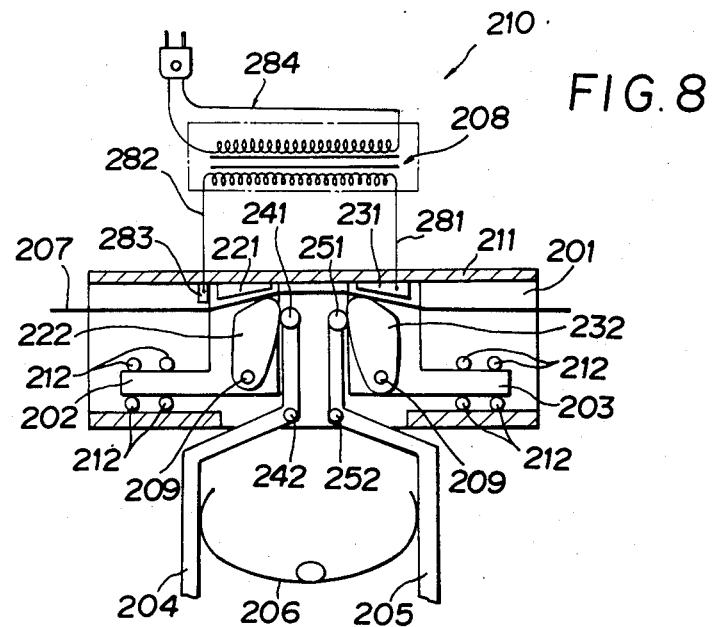
FIGS. 8 and 9 are explanatory diagrams showing another embodiment of the wire electrode cutting apparatus.
Figure 9:
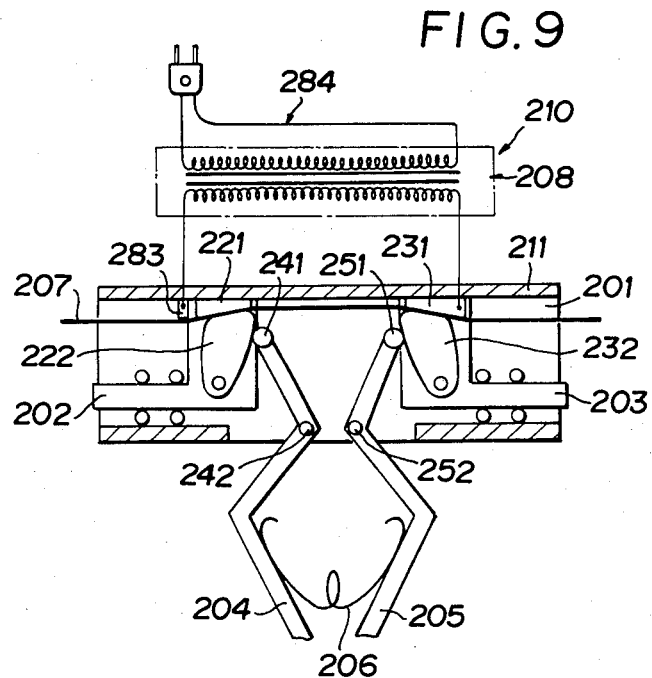

In FIGS. 8 and 9, reference numeral 210 represents a wire cutting apparatus. Its base 201 has a rectangular shape which is elongated in the moving direction of the wire electrode and has a projection 211 at its peripheral edge portion on the longitudinal side. Its vertical cross section in the longitudinal direction is U-shaped, and it is made of non-conductive material. A pair of L-shaped moving members 202 and 203 consisting of non-conductive material are respectively slidably supported in the longitudinal direction in the concave portion of the base 201 by means of a plurality of guide rollers 212 attached to the base 201.

Although not shown herein, there are provided stoppers for preventing moving members 202 and 203 from mutually approaching beyond the locations shown in FIG. 8 and springs adapted to press these moving members 202 and 203 toward the stoppers.

Wedge-shaped electrode members 221 and 231 each consisting of conductive material are fixedly adhered to one end of the respective moving members 202 and 203. On one hand, swinging pressure members 222 and 232 are attached to locations at which they face the electrode members and are detachable so that they are rotatable on axles 209.

A pair of bent levers 204 and 205 which respectively have rollers 241 and 251 at their tips are attached between the moving members 202 and 203 so that they can be freely opened and closed by opening-closing fulcrum axles 242 and 252 mounted at the peripheral edge portion of the base 201. The rollers 241 and 251 abut against the swinging pressure members 222 and 232, respectively.

A leaf spring 206 is interposed between the handles of the levers 204 and 205, so that the levers 204 and 205 are subject to the elastic force in the direction tending to open their handles. In the state shown in FIG. 8, the levers are positioned at maximum opening locations, namely at the moving end positions restricted by stoppers (not shown).

Although not shown similarly, springs are also interposed between the moving member 202 and the swinging pressure member 222 and between the moving member 203 and the swinging pressure member 232. These spring apply elastic forces in the direction so as to respectively detach the swinging pressure members 222 and 232 from the electrode members 221 and 231, thereby to come into contact with the rollers 241 and 251. Therefore, in the state shown in FIG. 8, gaps are formed through which a wire electrode 207 can pass almost rectilinearly as a whole between the moving members 202 and 203 and the swinging pressure members 222 and 232. Upon spark erosion, the wire electrode 207 is inserted therein.

A limit switch 283 is attached to the swinging pressure member 222. This limit switch 283 is turned on when the swinging pressure member 222 moves over a determined distance from the position shown in FIG. 8 to the left in the drawing.

The electrode members 221 and 231 are connected through the limit switch 283 to the secondary side of a transformer 208. The primary side of the transformer 208 is connected through a cable 284 to a commerical power source.

When the wire electrode is cut by the apparatus of this embodiment, the handles of the levers 204 and 205 mutually approach one another as shown in FIG. 9 against the elastic force of the spring 206 manually or by means of other suitable mechanical means. In this case, the head rollers 241 and 251 first press the swinging pressure members 222 and 232 to rotate them through an angle, thereby strongly sandwhich the wire electrode 207 existing between the electrode members 221 and 231. Then, the moving members 202 and 203 are pressed to the left and right to be opened. Thus, a constant tensile force is applied to the wire electrode 207, and when the moving member 202 is further opened and moves over a constant distance, the limit switch 283 is turned on. Hence, the wire-electrode 207 between the electrode members 221 and 231 is supplied with electric current and heated and, accordingly, is softened and elongated and is finally cut. The limit switch 283 is kept on during the cutting operation.

A DC power source and a controlled pulse power source may be of course, substituted for the transformer 208 as a power source to heat the wire electrode. It may be also possible to heat using an electric discharge circuit consisting of a capacitor to be charged by a direct current which is obtained by rectification of commercial electric power and a switching device which can control the discharge of said capacitor.

These heating power sources should be set or controlled so as not to cause fusion, vaporizing explosion, or the like due to overheating in dependence upon the material, its diameter, length, or the like of the wire-electrode.

Although the embodiment shown in FIG. 8 can be also used as an apparatus of the manually operating type, it may be also possible to use it at fixed locations on an arm holding column of the wire-cut electric discharge machine. In such a case, it can be constituted such that the cutting machine is placed in a proper location during the spark erosion and upon cutting operation of the wire-electrode, it is moved to a suitable cutting portion, thereby manually or automatically cutting the wire electrode. Furthermore, the operations of the levers 204 and 205, or the like and the power control or the like can be also controlled by a sequential control apparatus or the like.

Various modifications are possible with respect to the tensile force to be applied to the wire electrode and the magnitude of current flowing therethrough; however, for example, in the case of a brass wire having a diemeter of 0.2 mm, it is recommended to apply a tensile force of about 1.8-1.9 kg and to heat the wire electrode by passing a peak current of 30-150 A therethrough.

In this case, when the discharge energy of the capacitor is set to be extremely large, the wire electrode might have been fused and cut from the portion that become thin or the like, or otherwise it may further be explosively vaporized and fused. Such a situation is not preferred since the cutting portion is melted and solidified like a droplet and a large burr occurs and an oxidized decomposed portion or the like can be also caused.

As a tension detecting mechanism, it is possible to adopt other various kinds of well-known mechanical, electrical, or electromechanical methods in place of the above-mentioned method of measuring the motor driving current for driving the capstans.

As for a method of supplying power to and heating the wire electrode, it is possible to divisionally discharge a number of times from the capacitor by switching the switch a number of times or to repeat the charge and discharge a plurality of times. Furthermore, it is possible for the electrostatic capacity and/or charging voltage of the capacitor to be switched over and selected. It may be also possible to turn on and off a pulse power source which enables easy control of the heating current, for example a DC voltage source by a switching device with pulse-width modulating of the on-off signals.

For the supply and pulling sections of the wire electrode, it is possible to utilize mechanisms which are ordinarily provided for conventional wire-cut electric discharge mechine; however, it is possible to construct the sections for individual mounting at locations so as not to be obstacles to the spark erosion and only when the wire electrode is cut, are they are moved from an inoperative position to the cutting work positions, thereby performing the cutting operation.

The wire electrode cutting apparatus according to the present invention is constructed as described above; therefore, this can be installed by slightly modifying the wire-cut electric discharge machine that has been already used.

INDUSTRIAL AVAILABILITY

In the wire electrode cutting apparatus according to the present invention, since constant quantities of power and heat are applied to the wire electrode to be cut under a predetermined tensile force, as in a conventional well-known cutter, the wire electrode is cut under the most ideal conditions such that the shape and physical property of the cutting portion are constant and no burr exists, and that the end portion is linearly elongated and is appropriately hardened. Therefore, the wire-electrode can be extremely easily inserted through the guides and nozzles or the like of the electric discharge machine of through a small hole formed in a workpiece.

The wire electrode cutting apparatus according to the present invention is particularly suitable for installation on an electric discharge machine which is provided with an automatical wire inserting or threading apparatus.

What is claimed is:

1. A wire electrode cutting apparatus for a wire-cut electric discharge machine, comprising means for applying a predetermined tensile force to a portion of a wire electrode to be cut and means for supplying electrical current in a predetermined magnitude to said portion to heat said portion to soften the same in concurrence with the application of tensile force thereto the effect cutting of the wire electrode by the combination of the heating of the wire with application of tensile force thereto, said means for supplying electrical current comprising a contact holder movably supported for displacement towards and away from the wire electrode, a pair of spaced contacts positioned on said contact holder to contact the wire electrode at spaced locations on opposite sides of the location where the wire electrode is to be cut without substantially affecting the tensile force in the wire whereby the heating of the wire and the application of tensile force are applied to the wire at separate locations and control means for displacing the contact holder to bring the contacts into contact with the wire electrode and for operating the electrical current supplying means when the tensile force in said wire reaches a predetermined value.

2. A wire electrode cutting apparatus for a wire-cut electric discharge machine according to claim 1, wherein said tensile force applying means comprises: a capstan and a pinch roller on a pulling side of said wire electrode; braking means on a supply side of the wire electrode; a drive means for the capstan and means for measuring the current supplied to the drive motor.

3. A wire electrode cutting apparatus according to claim, wherein said tensile force applying means comprises mechanical means for gripping and pulling said wire electrode.

4. A wire electrode cutting apparatus according to claim 1, wherein said means for supplying electrical current further comprises a discharging circuit which includes a capacitor, a power source circuit for charging said capacitor to a predetermined voltage and switching means for controlling discharge of the charge of said capacitor through said contacts and the portion of said wire electrode to be cut.

5. A wire electrode cutting apparatus according to claim 1 wherein said means for supplying electrical current further comprises a circuit which includes an AC power source and switching means which connect said AC power source with said spaced contacts.

6. A wire electrode cutting apparatus according to claim 1, wherein said means for supplying electrical current further comprises a circuit which includes a DC power source and switching means which connect said DC power source with said spaced contacts 7. A wire electrode cutting apparatus according to claim 1, wherein said means for supplying electrical current further comprises a controlled pulse power source.

8. A wire electrode cutting apparatus according to claim 1 comprising means for cooling the wire at said spaced locations on said opposite sides of the location where the wire electrode is to be cut so that heating of the wire electrode is essentially restricted to the location at which it is to be cut.

9. A wire electrode cutting apparatus for a wirecut electric discharge machine, comprising means for applying a predetermined tensile force to a portion of a wire electrode to be cut and means for supplying electrical current in a predetermined magnitude to said portion to heat said portion to effect cutting thereof, said tensile force applying means comprising mechanical means for gripping and pulling said wire electrode, said mechanical means comprising a pair of opposed displaceable members, a wedge-shaped electrode on each displaceable member, a movable pressure member on each displaceable member facing the associated wedge-shaped electrode, and linkage means for moving said displaceable members between a first, inoperative position and a second operative position, said displaceable members in said first position forming a gap between the respective electrodes and pressure members for free passage of the wire electrode therebetween and in said second position the wire electrode is pressed by the pressure members against the wedge-shaped electrodes.

10. A wire electrode cutting apparatus according to claim 9 wherein said linkage means includes spring-loaded lever means for moving the displaceable members from the first position to the second position.

* * * * *